June 23, 1936.  G. W. BAUGHMAN  2,045,175
SPEED CONTROLLED BRAKE
Filed Dec. 20, 1933
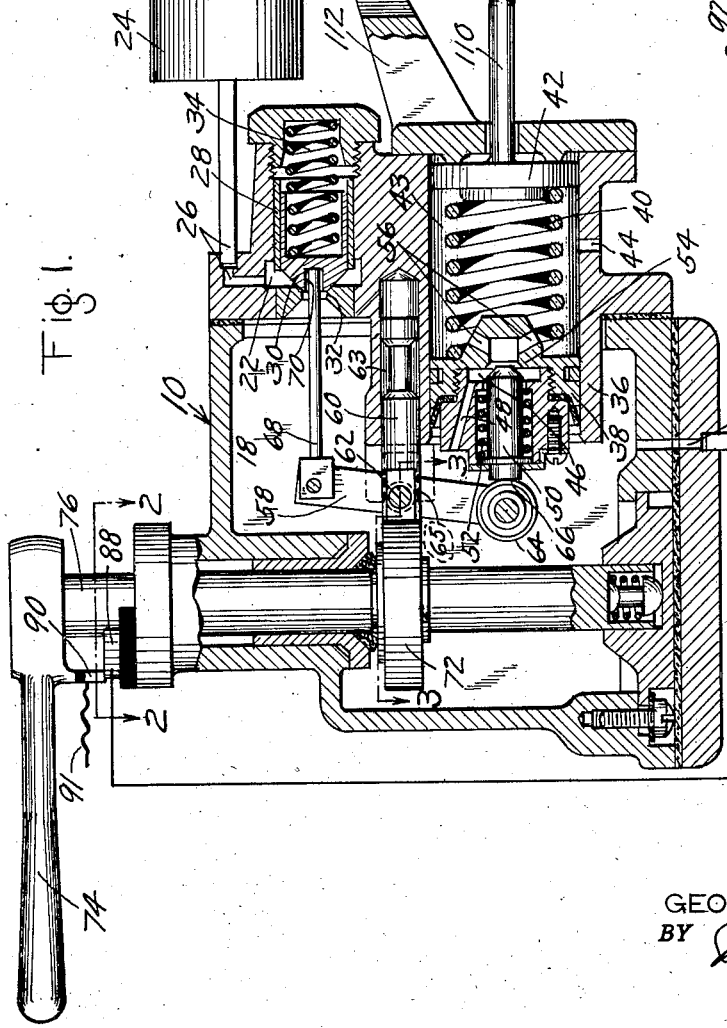
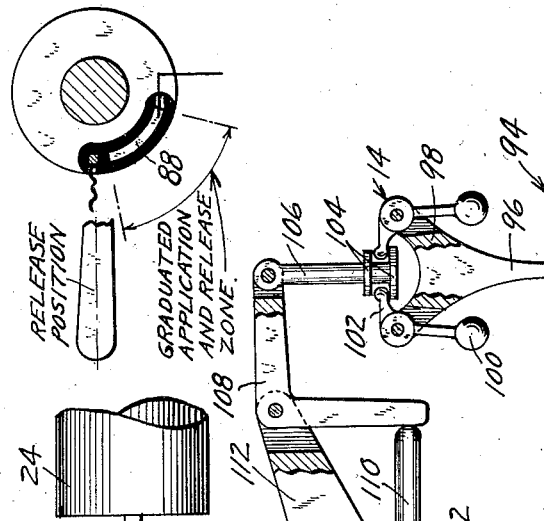
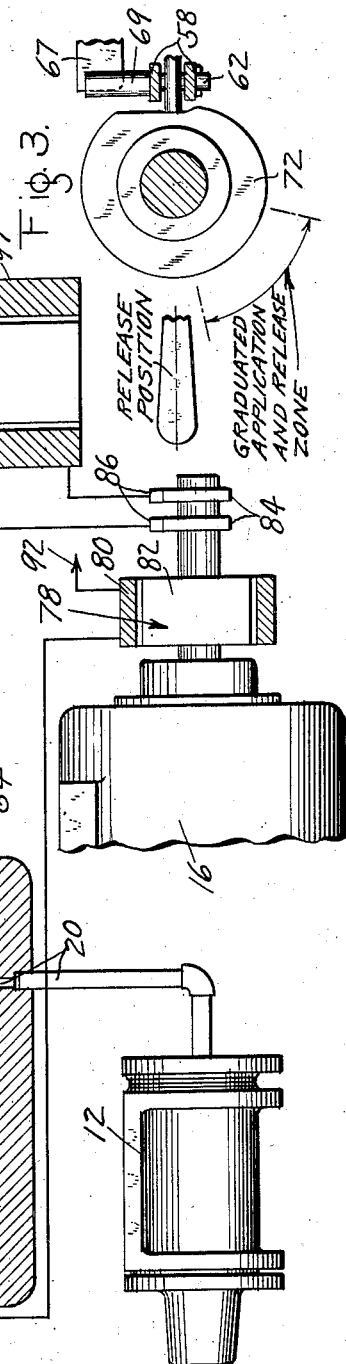
INVENTOR
GEORGE W. BAUGHMAN
BY *Wm. M. Cady*
ATTORNEY Patented June 23, 1936

2,045,175

UNITED STATES PATENT OFFICE 2,045,175

SPEED CONTROLLED BRAKE

George W. Baughman, Edgewood, Pa., assignor to The Westinghouse Air Brake Company, Wilmerding, Pa., a corporation of Pennsylvania Application December 20, 1933, Serial No. 703,228

14 Claims. (Cl. 303—21)

This invention relates to vehicle brakes, and more particularly to vehicle brake apparatus in which the braking force is controlled by the speed of the vehicle.

It is a well known fact that friction brakes may be applied with a higher maximum braking force at high vehicle speeds than at low vehicle speeds, due to the coefficient of friction between the frictionally engaging parts being lower at the high speeds than at the low speeds. Therefore, if the brakes are applied with a maximum braking force when the vehicle speed is high, the braking force must be diminished as the speed of the vehicle diminishes, otherwise skidding of the wheels will result, and in some cases dangerous shocks may be caused. In the present invention I contemplate the provision of a vehicle brake apparatus in which the maximum possible braking force is provided at all practical speeds by automatically regulating the braking force according to the speed of the vehicle.

It is a general object of my invention to provide means for effecting an initial application of the brakes in which the maximum braking force is limited to a predetermined value, and means for subsequently controlling the maximum braking force with which the brakes may be applied in accordance with the speed of the vehicle.

Another object of my invention is to provide means for controlling the application of the brakes in the form of a self-lapping type, manually operated, brake valve device, and a centrifuge device operated by the speed of the vehicle for controlling the operation of the self-lapping type valve device.

Other objects and advantages of my invention will be apparent from the following description, taken in connection with the attached drawing, in which:

Fig. 1 is a diagrammatic arrangement of one embodiment of my invention.

Fig. 2 is a view along the line 2—2 of Fig. 1.

Fig. 3 is a view along the line 3—3 of Fig. 1.

In the embodiment illustrated in the drawing, there is shown a brake valve device 10, adapted to control the supply of fluid under pressure to a brake cylinder 12, and a centrifuge device 14 operably associated with a vehicle motor 16 for controlling operation of the brake valve device 10.

The brake valve device 10, which is of the self-lapping type, comprises a casing, which is provided with a pressure chamber 18, having constant open communication with the brake cylinder 12 by a pipe 20. The casing is also provided with a valve chamber 22, with which a main reservoir 24 is in constant open communication through a pipe and passage 26. Contained in this chamber 22, and slidably mounted in a bushing member 28 secured to the casing, is a supply valve 30, adapted to seat on a valve seat 32 also carried by the casing. The valve 30 is urged to a seated position by action of a spring 34.

The casing is further provided with a cylinder 36 which is open at one end to the chamber 18. Operatively mounted in the cylinder 36, adjacent to its open end, is a movable abutment in the form of a piston 38. The piston or abutment 38 is subject on one side to the pressure of a spring 40 and on the other side to the pressure in the chamber 18. The spring 40 is in engagement with a slidable member 42 at the opposite end of the cylinder 36 from the movable abutment 38, the object of which will hereinafter appear. The chamber 43 formed between the movable abutment 38 and the slidable member 42 is in constant communication with the atmosphere through a port 44.

The piston or movable abutment 38 is provided with a valve chamber 46, which is in constant communication with the chamber 18 through passage 48. Contained in the valve chamber 46 is a release valve 50, urged to unseated position by spring 52 and adapted to cooperate with a seat 54 to control the release of fluid under pressure from the chamber 18, and hence from the brake cylinder 12, to the atmosphere by way of passages 56, chamber 43, and port 44.

For controlling operation of the supply and release valves 30 and 50 there is provided a mechanism comprising spaced levers 58, which are pivotally supported in a floating pivot carrier 60 at 62. The floating pivot carrier 60 slidably interfits a bore 63 in the casing and is adapted to be moved backward and forward as will hereinafter more fully appear. Rotatively held between the lower end of the spaced levers 58 is a roller 64 adapted to engage the outer end 66 of the release valve 50. Secured between the other ends of the spaced levers 58 is a pin member 68 having one end projecting in a recess 70 in the supply valve 30.

For the purpose of controlling the operation of the pivot carrying member 60, a rotatable cam 72 is provided and is adapted to be rotated through the medium of a handle 74 mounted in any manner on the end of a shaft 76, on which the cam 72 is secured.

In the brake valve device 10, the floating pivot carrier 60 is shown as a cylindrical member, and to prevent rotation of this pivot carrier within the bore 63 there is provided an extension 69 of the pin member 62, which is adapted to interfit with a slot 65 in a lug 67 projecting from the casing of the brake valve device.

It is to be here understood that the spring 52 associated with the release valve 50 is of less resistance than the spring 34 associated with the supply valve 30, while the two springs 52 and 34 are of less resistance than the spring 40 associated with the movable abutment 38. The object of this will hereinafter appear.

For controlling the operation of the brake valve device to provide for a maximum braking force in accordance with the speed of the vehicle, there is provided an alternating current generator, diagrammatically indicated at 78, essentially comprising a stator 80, and a rotor 82 having windings (not shown) connected to slip rings 84 having engagement with brushes or current collectors 86. The winding of the stator has one terminal thereof connected to a contact member 88 associated with the brake valve device 10, which terminal is adapted to be engaged by a movable contact 90 associated with the brake valve handle 74, to energize the stator winding 80 from a convenient source of current supply (not shown) by conductors 91 and 92. Contacts 88 and 90 are insulated from their supporting members and are adapted to be in engagement coextensive with the application and release zone of the brake valve handle 74, and to be out of engagement when the brake valve handle is in release position.

Connected to the brushes 86 of the alternating current generator 78 is a split phase induction motor, diagrammatically indicated at 94. This motor has a rotor 95 and a stator 97 and is adapted to be run at a speed in accordance with the frequency of the current supplied to it from the generator 78. The generator 78 may be operatively associated with any part of the vehicle which rotates as the vehicle moves, as for example, with the driving motor 16. It will, therefore, be obvious that as the motor 16 rotates, current will be generated in the generator of a frequency corresponding to the speed of the motor, and the split phase induction motor 94 will, therefore, be driven at a speed corresponding to this frequency, and hence to the speed of the vehicle.

Operatively associated with the induction motor 94 is the heretofore mentioned centrifuge device 14. This device is provided with a rotatable member 96 having a driving connection with the rotor 95 of the induction motor. The rotatable member 96 is provided with bifurcated portions 98 carrying centrifuge weights 100 pivotally secured therein and having counter-arms 102 interacting with collars 104. Associated with the collars 104 is a pin 106, pivotally secured to a bell crank lever 108 having one arm adapted to engage a stem 110 rigidly secured to the slidable member 42. The bell crank lever 108 may be pivotally supported from a bracket 112 integral with the casing of the brake valve device 10.

When the induction motor 94 is operated by current supplied from the generator 78, the weights 100 will move outwardly in accordance with the speed of the induction motor. As these weights move outwardly, the counter-arms 102 move the pin 106 downwardly, thereby causing the bell crank lever 108 to rotate in a clockwise direction and to thus position the movable member 42 to the left in accordance with the speed of the induction motor, and hence with the speed of the vehicle.

In operation, when the handle 74 of the self-lapping brake valve device 10 is in release position, the supply valve 30 is in seated position, thus cutting off the supply of fluid under pressure from the reservoir 24 to the chamber 18. Also, the release valve 50 is unseated, thus permitting fluid pressure in the brake cylinder 12 to be released to the atmosphere by way of pipe and passage 20, compression chamber 18, passage 48, valve chamber 46, passages 56, chamber 43, and port 44. Contacts 88 and 90 are out of engagement, thereby cutting off the supply of current to the generator 78. The brakes are thus held in released position and the centrifuge device 14 is inoperative.

When it is desired to effect an application of the brakes, the handle 74 is moved in a counterclockwise direction, as viewed in Figs. 2 and 3, through the zone marked "Graduated Application and Release Zone" an amount in accordance with the desired degree of braking. This movement of the handle 74 causes the pivot carrier 60 to be moved inwardly to the right, due to engagement between its end and the rising part of the cam 72. As the pivot carrier 60 moves thusly, the roller 64 moves the valve 50 to the right, against resistance of the spring 52, to its seated position, thus cutting off venting of fluid from the brake cylinder 12. As soon as the release valve 50 is seated, further movement of the pivot carrier 60 rocks the levers 58 to cause unseating of the supply valve 30, against resistance of the spring 34, thereby admitting fluid under pressure from the reservoir 24 to the chamber 18 by way of pipe and passage 26, and valve chamber 22, past the unseated valve 30. Fluid under pressure, therefore, immediately flows to the brake cylinder 12 by way of pipe and passage 20, and an application of the brakes is thus effected.

Simultaneously with the movement of the brake valve handle 74, contacts 88 and 90 are brought into engagement, thus energizing the stator winding 80 of the generator 78. Current is therefore immediately supplied to the induction motor 94 and rotation thereof causes the weights 100 to move outwardly in accordance with the speed of the induction motor.

If there were no centrifuge device, as the pressure in chamber 18 built up to a predetermined amount the pressure exerted on the movable abutment 38 would cause compression of the spring 40. The supply valve 30 would therefore be moved to the left by spring 34, and if the movable abutment moved far enough the valve would be seated, thus lapping the supply of fluid to the brake cylinder. If the pressure in chamber 18 was sufficient to move the movable abutment still further to the right, spring 52 would unseat the release valve 50, thus releasing the supply of fluid under pressure from the brake cylinder. For a given position of the handle 74 the seating of valve 30 and the unseating of valve 50, due to the pressure in chamber 18, would always take place at predetermined values of pressure, depending upon the resistance of the spring 40. For other positions of the handle 74 the valves would act at other corresponding pressures in chamber 18. The lapping of the fluid supplied to and its release from the brake cylinder would therefore occur in accordance with the conditioning of the brake valve device by operation of the handle 74.

With the centrifuge device 96 in operation, however, the pressure at which the brake valve device will lap and release is determined by action of the centrifuge device on the slidable member 42. If the speed at which the vehicle is traveling is high, the weights 100 will be moved outwardly a relatively large distance, whereupon the slidable member 42 will be moved correspondingly to the left. This movement will, therefore, be opposed by the pressure exerted on the side of the movable abutment adjacent to chamber 18. If the pressure exerted on the slidable member 42 by the centrifuge device is greater than the pressure exerted on the movable abutment 38 from the chamber 18, the movable abutment will be moved to the left, thereby opening the supply valve 30 wider. It will therefore require a higher pressure in the chamber 18 to cause lapping of the valve device. As a consequence, the pressure supplied to the brake cylinder 12 will be higher and the brakes will be applied with a greater braking force than would be effected by the brake valve device without operation of the centrifuge device. Similarly, a higher pressure will be required to effect a release of the brakes.

As the speed of the vehicle diminishes, the centrifuge weights 100 will move inwardly, and thus the pressure exerted on the slidable member 42 will diminish. The movable abutment 38 will then move to the right and the supply valve 30 will also move a corresponding distance to the left. As the speed of the vehicle diminishes further, a point will be reached where the pressure on the member 42 is less than that on the movable abutment 38 from the chamber 18 and the centrifuge device will then have no effect upon the brake valve device. As the vehicle approaches a stop the braking pressure will be entirely within the control of the operator by manipulation of the brake valve handle 74.

It is to be understood that as the speed of the vehicle diminishes the movement of the weights 100 inwardly is a gradual movement, thereby causing a correspondingly gradual movement of the slidable member 42 to the right. The pressures in chamber 18 at which the brake valve laps or releases will therefore gradually decrease from a maximum corresponding to the maximum outward position of the weights 100, to a minimum corresponding to the condition of the brake valve device as established by manipulation of the handle 74.

As the vehicle is brought to a stop, the rotor 82 of the generator 78 will be at rest and there will, therefore, be no current supplied to the induction motor 94. The centrifuge device 14 will therefore be inoperative. The vehicle is held at rest then by controlling the braking pressure with the handle 74.

While one illustrative embodiment of the invention has been described in detail, it is not my intention to limit its scope to that embodiment or otherwise than by the terms of the appended claims.

Having now described the invention, what I claim as new and desire to secure by Letters Patent, is:

1. In a vehicle brake apparatus, a brake valve handle having a release position and movable in a graduated application and release zone, a contact operated by said handle and closed while the handle is at any position in said zone, a self-lapping valve device, means operated by said handle for conditioning said valve device to cause lapping of the brakes at any desired pressure, an alternating current generator operatively connected with a rotating part of the vehicle and energized when and only when said contact is closed, a synchronous motor operated by current supplied by said generator, a centrifuge device operated by said motor, and means operated by said centrifuge device for modifying the manual conditioning of said valve device.

2. In a vehicle brake system, in combination, a brake cylinder, a control element having a release position and movable manually different distances into an application zone, means responsive to movement of said element for effecting a supply of fluid under pressure to said brake cylinder, regulating means responsive to the pressure of fluid supplied to said brake cylinder for causing said last means to effect a lap of said supply at a pressure corresponding to the distance which said control element has been moved into said application zone, and means governed by the speed of the vehicle for causing said regulating means to effect said lap of said supply at pressures other than that corresponding to said movement of said control element.

3. In a vehicle brake system, in combination, a brake cylinder, a control element having a release position and manually operable different distances into an application zone, valve means responsive to movement of said element for effecting a supply of fluid under pressure to said brake cylinder, regulating means responsive to the pressure of fluid supplied to said brake cylinder for normally causing said valve means to effect lapping of said supply at a pressure corresponding to the distance said control element is moved, and means governed by the speed of the vehicle for causing said regulating means to effect said lap of said supply according to the speed of the vehicle rather than according to the distance said control element is moved.

4. In a vehicle brake system, in combination, a brake cylinder, a control element manually movable different distances according to a desired degree of application of the brakes, a normally closed valve controlling a communication through which fluid under pressure is supplied to said brake cylinder, means for opening said valve a distance corresponding to the degree of movement of said control element, a movable abutment responsive to the pressure of fluid supplied to said brake cylinder for effecting closing of said valve, and means for varying at what pressure said valve is caused to be closed according to the speed of the vehicle.

5. In a vehicle brake system, in combination, a brake cylinder, a normally closed valve for controlling a communication through which fluid under pressure is supplied to said brake cylinder, a lever mechanism for opening said valve, a control element for manually controlling applications of the brakes, means for actuating said lever mechanism to open said valve a distance according to the degree of movement of said control element, means responsive to the pressure of fluid supplied to said brake cylinder for effecting closing of said valve, and speed controlled means for determining at what pressure said last means effects closing of said valve.

6. In a vehicle brake system, in combination, a casing defining a chamber, a normally closed valve controlling a communication through which fluid under pressure is supplied to said chamber, a control handle, a cam and lever mechanism for opening said valve to a degree corresponding to the degree or extent of movement of said handle, and means for controlling closing of said valve according to the speed of the vehicle.

7. In a vehicle brake system, in combination, a casing defining a chamber, a normally closed valve for controlling a communication through which fluid under pressure is supplied to said chamber, means for opening said valve to supply fluid under pressure to said chamber to effect an application of the brakes, a pair of movable abutments, a spring interposed between said abutments, one of said abutments being subject to the pressure of fluid supplied to said chamber and operable at some chosen pressure to effect closing of said valve, and speed controlled means for exerting an opposing pressure on said other abutment according to the speed of the vehicle.

8. In a vehicle brake system, in combination, a casing defining a chamber, a supply valve controlling the supply of fluid under pressure to said chamber, a movable abutment subject on one side to pressure of fluid supplied to said chamber and on the other side to pressure of a spring, a release valve carried by said movable abutment for controlling the release of fluid under pressure from said chamber, a control element, means responsive to movement of said control element for effecting closing of said release valve and opening of said supply valve, said movable abutment being movable subsequently at a chosen pressure of fluid in said chamber to effect closing of said supply valve through said last means, and means governed by the speed of the vehicle for controlling movement of said abutment.

9. In a vehicle brake system, in combination, a casing defining a chamber, a supply valve for controlling the supply of fluid under pressure to said chamber, a movable abutment subject on one side to pressure of fluid supplied to said chamber and on the other side to pressure of a spring, a release valve carried by said abutment for controlling the release of fluid under pressure from said chamber, a lever mechanism for controlling opening and closing of said release and supply valves, means for actuating said lever mechanism to effect closing of said release valve and opening of said supply valve, said movable abutment being operable at a chosen pressure of fluid supplied to said chamber to operate said lever mechanism to subsequently close said supply valve, and means governed by the speed of the vehicle for determining at what pressure said movable abutment effects closing of said supply valve.

10. In a vehicle brake system, in combination, a casing defining a chamber, a normally closed supply valve for controlling the supply of fluid under pressure to said chamber, a movable abutment subject on one side to the pressure of fluid in said chamber and on the other side to the pressure of a spring, a release valve carried by said movable abutment for controlling the release of fluid under pressure from said chamber, a lever mechanism for actuating said supply and release valves, a movable pivot carrier carrying said lever mechanism, a control handle, means for actuating said pivot carrier a distance in accordance with the movement of said handle, whereby said lever mechanism effects closing of said release valve and opening of said supply valve, said movable abutment being responsive to a chosen pressure of fluid in said chamber to subsequently effect closing of said supply valve, and a centrifuge device for controlling operation of said movable abutment in effecting closing of said supply valve.

11. In a vehicle brake system, in combination, a brake cylinder, a supply valve controlling a communication through which fluid under pressure is supplied to said brake cylinder, a release valve controlling a communication through which fluid under pressure is released from said brake cylinder, a lever mechanism controlling opening and closing of said release and supply valves, means for actuating said lever mechanism to open said supply valve and close said release valve, a movable abutment subject on one side to pressure of fluid supplied to said brake cylinder and on the other side to pressure of a spring and being operable to actuate said lever mechanism at a chosen pressure to effect closing of said supply valve and at a higher pressure to effect opening of said release valve, a centrifuge device operable to vary the pressure exerted on said movable abutment by said spring, a motor driving said centrifuge device, and a generator driven according to the speed of the vehicle for supplying current to said motor.

12. In a vehicle brake system, in combination, a brake cylinder, a brake valve device having a normally closed supply valve and a normally open release valve for controlling supply of fluid under pressure to and its release from said brake cylinder, a control handle having a release position and movable different distances through an application zone, means responsive to movement of said handle for effecting closing of said release valve and opening of said supply valve, a movable abutment subject to the pressure of fluid supplied to said brake cylinder for effecting closing of said supply valve at a pressure corresponding to the distance through which said handle is moved, a centrifuge device for governing movement of said movable abutment, a motor driving said centrifuge device, a generator operated according to the speed of the vehicle for supplying current to said motor, and contacts closable upon movement of said handle to said application zone for energizing said generator.

13. In a vehicle brake system, in combination, a brake cylinder, a normally closed valve for controlling a communication through which fluid under pressure is supplied to said brake cylinder, means for effecting opening of said valve to supply fluid under pressure to said brake cylinder, two movable abutments, a spring interposed between said abutments, one of said abutments being movable toward the other by pressure of fluid supplied to said brake cylinder, means responsive to movement of said last mentioned movable abutment for effecting closing of said valve, and speed controlled means for applying a pressure to said other movable abutment to oppose said movement.

14. In a vehicle brake system, in combination, a brake cylinder, means for effecting a supply of fluid under pressure to said brake cylinder, a release valve adapted to be closed when fluid under pressure is supplied to said brake cylinder and operable when opened to release fluid under pressure from said brake cylinder, two movable abutments disposed in spaced relationship, a spring interposed between said abutments, one of said two abutments being subject to the pressure of fluid supplied to said brake cylinder and operable at a chosen pressure to effect opening of said release valve, and speed controlled means acting upon said other abutment to oppose movement of said first abutment according to the speed of the vehicle.

GEORGE W. BAUGHMAN.